United States Patent [19]

Brown et al.

[11] Patent Number: 4,790,971

[45] Date of Patent: Dec. 13, 1988

[54] SHUTTLE TRANSFER SYSTEM

[75] Inventors: Ross A. Brown, Cadillac; Guy M. Davis, Traverse City, both of Mich.

[73] Assignee: TranTek Inc., Traverse City, Mich.

[21] Appl. No.: 883,584

[22] Filed: Jul. 9, 1986

[51] Int. Cl.⁴ .................. B21D 53/24; B29C 45/16; F16B 37/12

[52] U.S. Cl. .................. 264/138; 264/242; 264/262; 264/264; 264/267; 264/276; 264/318; 10/86 R; 74/424.8 R; 411/908

[58] Field of Search .............. 264/138, 219, 242, 264, 264/318, 310, 261, 262, 267, 275, 276, 277, 278; 74/424.7, 424.8 R, 424.8 B, 457, 458, 459; 10/86 A, 86 R; 411/302, 303, 304, 908, 947, 979

[56] References Cited

U.S. PATENT DOCUMENTS

| | | | |
|---|---|---|---|
| 2,421,105 | 5/1947 | Warren | 10/86 A |
| 2,741,288 | 4/1956 | Johnson | 10/86 A |
| 3,081,644 | 3/1963 | Hudgens | 264/264 |
| 3,097,060 | 7/1963 | Sullivan | 264/242 |
| 3,294,139 | 12/1966 | Preziosi | 264/267 |
| 3,313,873 | 4/1967 | Dembiak | 264/318 |
| 3,407,251 | 10/1968 | Elliot et al. | 264/242 |
| 3,579,684 | 5/1971 | Duffy | 10/86 R |
| 3,634,577 | 1/1972 | Kull | 264/267 |
| 3,670,583 | 6/1972 | Leming | 74/89 |
| 4,501,041 | 2/1985 | Wallace | 10/86 A |
| 4,531,702 | 7/1985 | Plummer | 264/1.5 |

Primary Examiner—James Lowe
Assistant Examiner—Jeremiah F. Durkin, II
Attorney, Agent, or Firm—Reising, Ethington, Barnard, Perry & Milton

[57] ABSTRACT

The threads of a nut on a multithreaded, high helix lead screw are formed by disposing a nut over a lead screw where the center hole of the nut is larger than the threads of the lead screw. Polymer material is filled into the space between the nut and the lead screw and cured to form a high helix, multithreaded nut which has threads complimentary to the threads of the lead screw.

9 Claims, 3 Drawing Sheets

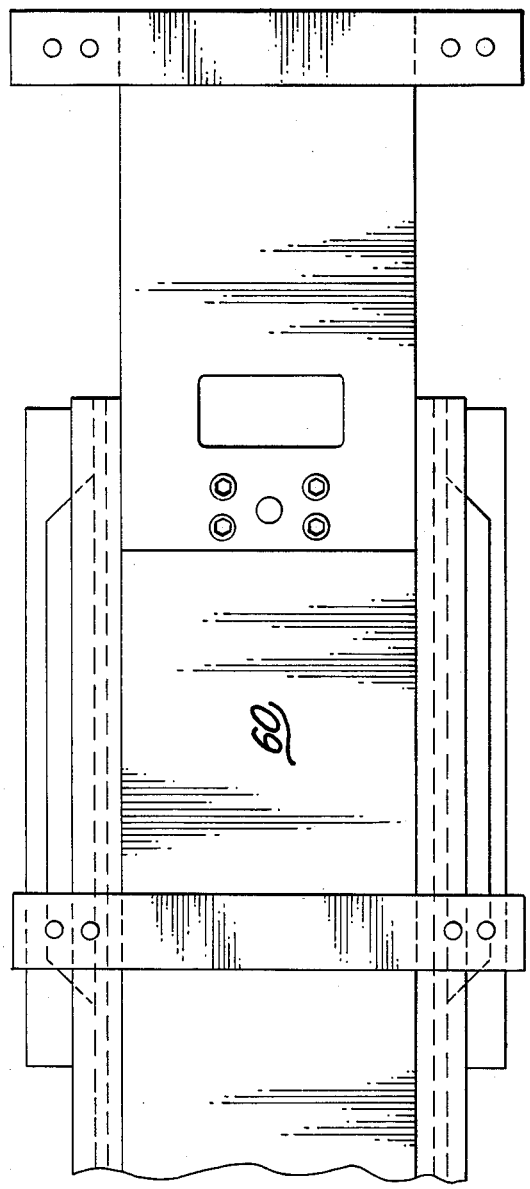
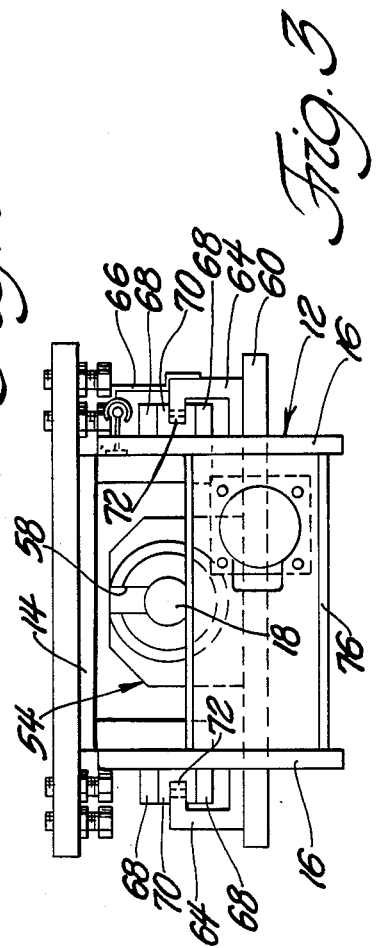
Fig. 2
Fig. 3

SHUTTLE TRANSFER SYSTEM

TECHNICAL FIELD

The subject invention relates to long span lead screw and nut drives, and particularly, high speed programmable electric shuttle systems utilizing a long span lead screw and nut drive carriage for transferring high load devices at high speeds along the lead screw.

BACKGROUND ART

A shuttle device utilizing a long span screw and nut drive have been used to transmit heavy torque and thrust loads at relatively high speeds. One such device is shown in U.S. Pat. No. 3,670,583 in the name of John C. Leming, which includes a nonrotatable coactive nut operatively mounted on a rotary screw and adapted to travel freely linearly along the screw.

The problem with conventional lead screws and nut drive assemblies is that the nut threads have to be machined to match the threads of a lead screw. At high speeds, the nut drive and lead screw may vibrate due to the tolerance difference between the lead screw and nut drive threads. Also, misalignment of the nut drive and lead screw may occur due to the machining tolerances on the threads of the nut drive. Further, large amounts of power are required to drive various loads due to the large amount of pitch in a single lead screw.

One approach to correcting this problem has been to inject the nut with an epoxy material called Moglice. The Moglice material has special fillers that allow it to have high strength, lubricity, wearability, without the normal brittleness associated with epoxy. The nut thread form is injected into the screw directly as denoted in the Wedin Corporation publication "Diamant Moglice".

The problem with this approach is that the application of Moglice to a single thread lead screw will not permit high helix with high loads for high speed transfer. Further, a single thread lead screw has a helix ratio of one to one (1" lead for each 1" diameter) which requires the screw to operate at a very high RPM near the critical speed of the screw.

STATEMENT OF THE INVENTION AND ADVANTAGES

A lead screw shuttle drive assembly for transferring high load devices at high speeds includes a screw having threads and support means at each end of the screw for rotatably supporting and journalling the ends of the screw. A drive means rotates the screw and a nonrotatable nut having threads coactive with the threads of the screw travels along the longitudinal length of the screw during rotation thereof. The assembly is characterized by the threads of the nut and the screw each being multithreaded. The threads of the nut are formed about the threads of the screw for providing multipoint full thread contact completely about the screw and minimizing tolerances between the threads of the screw and the threads of the nut to move the nut at high speeds between the ends of the screw.

The subject invention further provides a method of forming the threads of a nut on a lead screw of a nut drive and lead screw assembly. The steps include disposing a nut having a cylindrical tube and center hole larger than the diameter of the threads of the lead screw about the lead screw, filling the radial space between the center hole and lead screw with a polymer material, curing the polymer material and forming the threads of the nut from the lead screw for providing multipoint full thread contact completely about the screw and minimizing tolerances between the thread of the screw and nut to move the nut at high speeds between the ends of the screw.

Accordingly, the subject invention is a high speed transfer mechanism designed to handle high loads. The subject invention has a multithread screw providing a long helix capability which permits the screw to operate at a lower RPM, thus avoiding the critical speed of the screw. The subject invention also provides full lead contact resulting in the elimination of backlash and providing highly accurate positioning capabilities. Also, the subject invention minimizies tolerances between the threads of the screw and the nut and eliminates the need for precision-ground threads on the nut and screw which are very costly. The subject invention has an efficiency equivalent to conventional ball screws (90%); but with a cycle life exceeding ten (10) times the cycle life of a ball screw.

FIGURES IN THE DRAWINGS

Other advantages of the present invention will be readily appreciated as the same becomes better understood by reference to the following detailed description when considered in conjunction with the accompanying drawings wherein:

FIG. 2 is a sectional view taken substantially along lines 2—2 of FIG. 1;

FIG. 3 is a sectional view taken substantially along lines 3—3 of FIG. 1;

DESCRIPTION OF THE PREFERRED EMBODIMENT

Figure 1:
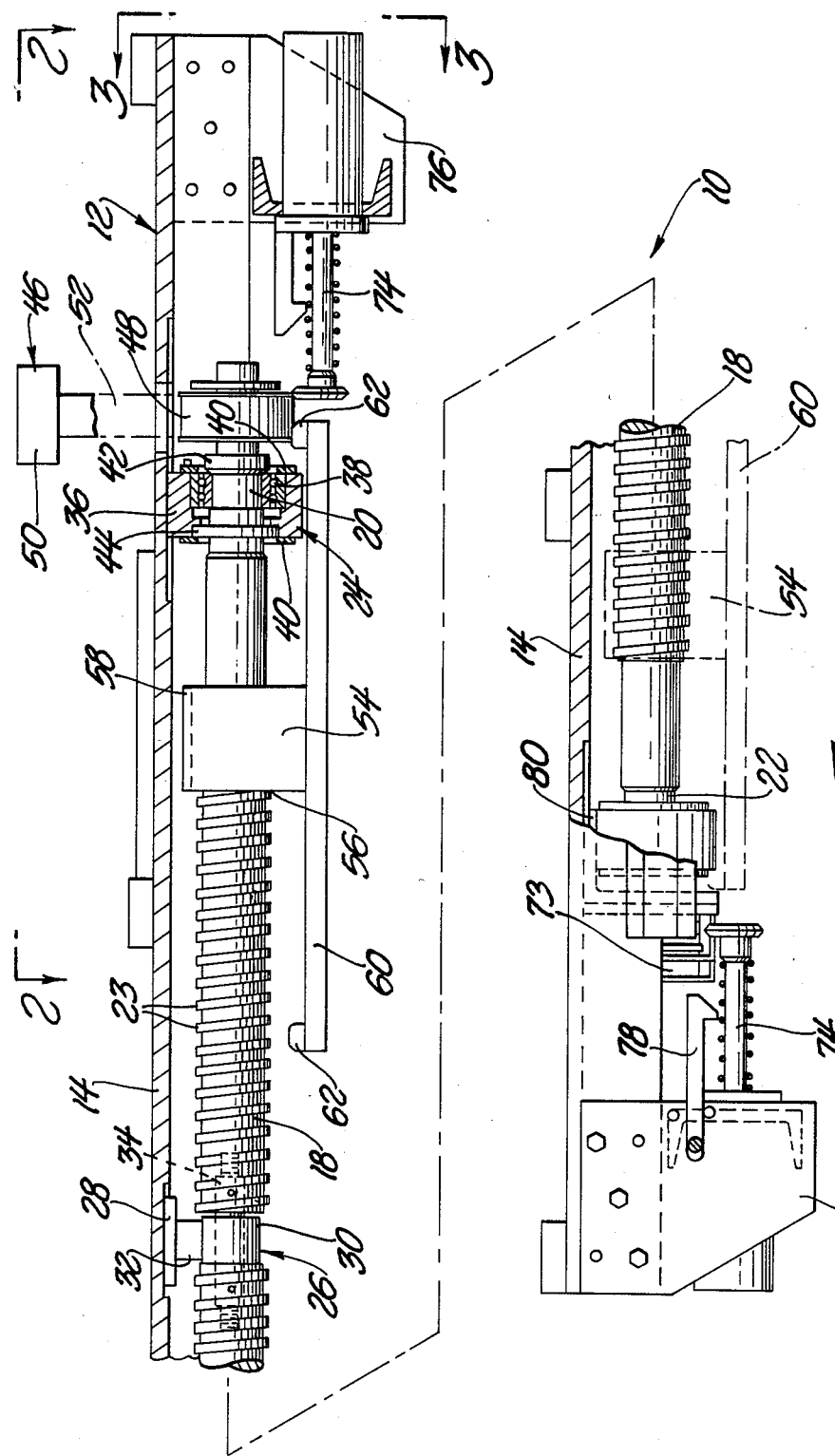
FIG. 1 is an elevational view of the subject invention.

A lead screw shuttle drive assembly for transferring high load devices (i.e., 5000 lbs.) at high speeds (i.e., 300 ft./min) is generally shown at 10 in FIG. 1. The assembly 10 includes a shuttle housing, generally indicated at 12, connected to a support surface. The shuttle housing 12 includes a U-shaped channel or top plate member 14 and side plates 16 extending vertically outwardly from the flanges or edges of the top plate member 14. The side plates 16 may be formed as an integral member with the top plate member 14 or may be secured to the top plate member 14 by welding or any other suitable means. The shuttle housing 12 is constructed of high quality steel.

The assembly 10 includes a long span lead screw 18 having ends 20 and 22. The screw 18 has threads 23 and is multithreaded, two or more distinct threads in number (i.e., four separate thread formations). A nonrotary support means, generally indicated at 24, at each end 20, 22 of the screw 28 is used for rotatably supporting and journalling the ends 20, 22 of the screw 18. The screw 18 may have coaxial, corotative screw sections 18 with the thread grooves of the screw sections 18 operatively aligned. The screw 18 has a high helix or thread lead to diameter ratio greater than one (i.e., four inch lead for a 3 inch diameter screw). This results in a lower RPM horsepower requirement to drive various loads.

The nonrotary support means 24 includes a standoff bracket, generally indicated at 26, supporting and connecting a pair of the screw sections 18 at the ends thereof and rotatably journalling the screw sections 18. In other words, the screw 18 may be made in several sections in which a standoff bracket 26 connects and supports the ends of a pair of screw sections 18. The standoff bracket 26 comprises a base 28 connected to the top plate member 14 of the shuttle housing 12, a journal head 30 and a spacer web 32 between or interconnecting the base 28 and the journal head 30. A connecting member 34 threadably interconnects the screw sections 18 at the ends thereof and is disposed within the journal head 30 of the standoff bracket 26. The journal head 30 of the standoff bracket 26 is a cylindrical tube having a diameter less than the root diameter of the screw sections 18. The web 32 of the standoff bracket 26 is substantially narrower than the root diameter of the screw sections 18.

The nonrotary support means 24 also includes a bearing housing 36 connected to the top plate member 14 of the shuttle housing 12 to support the drive end 20 of the screw 18. A bearing means 38 is disposed within the bearing housing 36 for rotatably supporting the drive end 20 of the screw 18. The bearing means 38 may be a ball or roller bearing or the like. A retainer 40 is connected at each end of the bearing housing 36. The retainer 40 may be a washer or the like. A lock nut 42 is disposed about the screw 18 and secures the bearing means 38 within the bearing housing 36. A seal member 44 is disposed within the bearing housing 36 about the screw 18 opposite the bearing means 38 to prevent dirt and other contaminants from entering the bearing housing 36.

The assembly 10 includes a drive means, generally indicated at 46, for rotating the screw 18. The drive means 46 includes a pulley 48 attached to the drive end 20 of the screw 18 and a drive motor 50 and a belt 52 interconnecting and cooperating with the pulley 48 and drive motor 50. The drive motor 50 may be an electric motor or the like. Further, any suitable drive means may be used to rotate the screw 48.

The assembly 10 further includes a nonrotatable nut 54 having threads 56 coactive with the threads 23 of the screw 18 to travel longitudinally along the length of the screw 18 during rotation thereof. The nut 54 and screw 18 are multithreaded, i.e., each having four distinct thread patterns. The threads 56 of the nut 54 are formed about the threads 23 of the screw 18 for providing multipoint full lead or thread contact completely about the screw 18 and minimizes tolerances between the threads of the screw 18 and nut 54 to move the nut 54 at high speeds between the ends of the screw 18. In other words, the multipoint or multithreads provide long helix (i.e., more than 1" lead for each 1" diameter) to provide full contact of the screw threads and grooves with the nut threads and grooves and vice versa, completely about the screw 18 rather than conventional ball screws which provide only point to point contact. The threads 56 are made of a polymer material known as Moglice for lubricating and dissipating heat between the threads of the nut 54 and screw 18. Hence, the life of the screw 18 is increased. The Moglice formed threads 56 act as a wiper to remove foreign matter from the threads 23 of the screw 18, and the Moglice threads 56 will absorb foreign matter (i.e., metal shavings).

The nut 54 is cylindrical in shape and has a longitudinal slot 58 to clear the web 32 of the standoff bracket 26 in relative passing of the nut 54 past the standoff bracket 26. The nut slot 58 is of a width which is only slightly greater than the width of the web 32 of the standoff bracket 26. The nut 54 also includes a carriage or plate member 60 attached to the nut 54 opposite the nut slot 58 to allow attachment of objects to the plate member 60 to be moved along the screw 18. The plate member 60 includes a catch pad 62 in the form of a rectangular bar attached to each end of the plate member 60. The carriage plate 60 also includes a carrier bracket 64 connected longitudinally on both sides of the plate member 60. The carrier bracket 64 has a U shape and is disposed longitudinally parallel to the screw 18 along the length thereof to the plate member 60. A sensing means 66 is connected to one of the carrier brackets 64 for sensing the linear displacement of the nut 54 along the length of the screw 18. The sensing means 66 may be a linear displacement transducer or the like for sensing the linear displacement.

The assembly 10 includes a pair of guide plates or channels 68 being substantially parallel to one another and connected to the side plates 16 of the shuttle housing 12. A guide means 70 interconnects the guide channels 68 for guiding and supporting the nut 54 to travel along the screw 18 in a stabilized spaced substantially concentric friction-free relation. The guide means 70 includes a polymer material such as Moglice formed in a U shape and defining a channel 72 in which one flange of the U-shaped carrier bracket 64 is disposed in the channel 72. In other words, a ploymer material such as Moglice is molded about the load bearing upper flange of the carrier bracket 64 forming a U-shaped cap 70 so that as the carrier bracket 64 is moved with the plate member 60, the one upper flange and attached cap 70 slide in the channel 72 between the guide channels 68. An air bearing system (not shown) may be used in the channel 72 in addition to Moglice to increase the life of the assembly 10 and reduce starting torque.

The assembly 10 also includes brake means 73 at the end 22 of the screw 18 for stopping rotation of the screw 18 upon power cut off, or the nut 54 exceeding a predetermined position. The brake means 73 may be any suitable means such as a conventional drum or disc brake. A mounting bracket 80 connected to the shuttle housing 12 supports the brake means 73. Further, the assembly 10 includes shock absorber means 74 at each end 20, 22 of the screw 18 for preventing contact of the nut 54 with either of the brake means 73 or bearing housing 36. The shock absorber means 74 may be a hydraulic shock absorber or the like having a spring disposed about the shaft of the shock absorber. A mounting bracket 76 is connected to the shuttle housing 12 to support the shock absorber means 74. Further, a safety latch 78 is connected to the mounting bracket 76.

Figure 4:
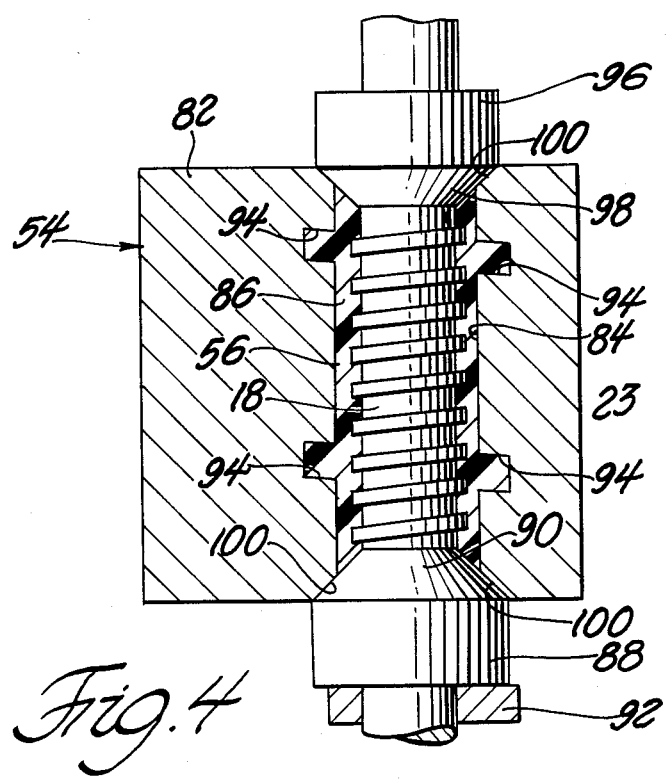
FIG. 4 is a sectional view of the device for forming the threads of the nut.
Figure 5:
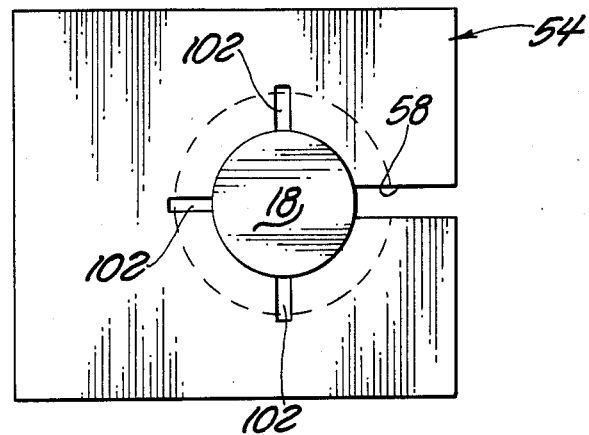
FIG. 5 is a side elevational view of the formed threads of the nut of the subject invention.

In accordance with the subject invention, there is provided a method of forming the threads of a nut 54 from a lead screw 18 of a nut drive and lead screw assembly as illustrated in FIG. 4 in which the screw 18 and nut 54 are shown in the vertical upright position. The method includes the steps of disposing a nut 54 having a cylindrical tube 82 and a center hole 84 larger than the diameter of the threads 23 of the lead screw 18 about the threads 23 of the lead screw 18. The steps include filling the radial space 86 between the center hole 84 and the lead screw 18 with a polymer material (i.e., Moglice) and curing the polymer material to form the threads 56 of the nut 54 complementary to the threads 23 of the lead screw 18. The steps include placing a centering member 88 having a tubular configuration and an inclined face 90 about the screw 18 at one end of the nut 54 to center the screw 18 within the center hole 84 of the nut 54. The steps further include clamping a clamp member 92 about the screw 18 to support the centering member 88 on the screw 18. In other words, due to gravity the nut 54 rests on the centering member 88 and the clamp member 92 supports the centering member on the screw 18. The steps also include filling the centering member 88 in the space between the screw 18 and the centering member 88 with a putty material prior to clamping the clamp member 92 about the screw 18.

The method includes at least one, and preferably two, longitudinally spaced annular grooves 94 about the center hole 84 and into the cylindrical tube 82 of the nut 54 to support and retain the polymer material after filling and curing. The method also includes the steps of placing a second centering member 96 about the screw 18 at the other end of the nut 54 to center the nut 54 about the screw 18. Said another way, the centering members 88 and 96 center the nut 54 about the screw 18 and act to prevent the polymer material from escaping the nut 54 during filling and curing. The method further includes forming complementary inclined surfaces 90, 98 on the centering members 88, 96 respectively, and about the center hole 84 at each end of the nut 54 to center the nut 54 about the screw 18.

The method includes removing the screw 18 from the nut 54 after curing of the polymer material and cutting longitudinal slots 102 below the depth of the root or root depth of the threads 56 along the length thereof to provide lubrication ports in the nut 54. Further, the steps include forming a cap 70 on the upper flange of carrier brackets 64 by molding and curing the polymer material in the channel 72 between the carrier brackets 64', to define a U-shaped cap 70. Further, the steps include spraying a release agent on the threads of the lead screw 18 prior to filling the space 86 between the lead screw 18 and center hole 84 of the nut 54 with the polymer material. Further, the screw 18 may be coated with paint or the like prior to the Moglice being molded to be dissolved after curing to provide for clearances between the nut 54 and screw 18.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of forming the threads (56) of a nut (54) on a multithreaded, high helix lead screw (18) of a nut drive and lead screw assembly (10), said method comprising the steps of disposing a nut (54) having a cylindrical tube (82) and a center hole (84) larger than the diameter of the threads (23) of the lead screw (18) about the lead screw (18), filling the radial space (86) between the center hole (84) and the lead screw (18) with a polymer material, curing the polymer material and forming the high helix multiple threads (56) of the nut (54) complementary to the threads (23) of the lead screw (18) for providing polymer nut threads (56) having a greater radial thickness than the screw threads (23) and multipoint full thread contact completely about the screw (18) and minimizing tolerances between the threads (23,56) of the screw (18) and nut (54) to move the nut (54) at high speeds between the ends of the screw (18).

2. A method as set forth in claim 1 including the step of placing a centering member (88) about the screw (18) at one end of the nut (54) to center the screw (18) within the center hole (84) of the nut (54).

3. A method as set forth in claim 2 including the step of forming at least one annular groove (94) about the center hole (84) to support and retain the polymer material after filling and curing.

4. A method as set forth in claim 3 including the step of clamping a clamp member (92) about the screw (18) to support the centering member (88) on the screw (18).

5. A method as set forth in claim 4 including the step of filling the centering member (88) with a putty material prior to clamping the clamp member (92) about the screw (18).

6. A method as set forth in claim 5 including the step of placing a second centering member (96) about the screw (18) at the other end of the nut (59) to center the nut (54) about the screw (18).

7. A method as set forth in claim 6 including the step of forming complementary inclined surfaces (90, 98) on the centering members (88, 96) center hole (84) of the nut (54), respectively, to center the nut (54) about the screw (18).

8. A method as set forth in claim 7 including the step of removing the screw (18) from the nut (54) after curing of the polymer material and cutting longitudinal slots (102) below the depth of the root of the threads (56) along the length thereof to provide lubrication ports.

9. A method as set forth in claim 8 including the step of spraying a release agent on the threads (23) of the screw (18) prior to filling the space (86) between the lead screw (18) and center hole (84) of the nut (54) with the polymer material.

* * * * *